United States Patent [19]

D'Amelia et al.

[11] Patent Number: 5,458,891
[45] Date of Patent: Oct. 17, 1995

[54] CHEWING GUM CONTAINING FLAVORANT ADSORBED IN CROSS-LINKED ELASTOMERIC POLYMER

[75] Inventors: Ronald P. D'Amelia, Hicksville, N.Y.; Theresa R. Cea, Brooklyn, both of N.Y.; John E. Beam, Winston-Salem, N.C.; Roy A. White; Susan C. Agro, both of Somers, Conn.

[73] Assignee: Nabisco, Inc., Parsippany, N.J.

[21] Appl. No.: 204,035

[22] Filed: Mar. 1, 1994

[51] Int. Cl.⁶ .................................................. A23G 3/30
[52] U.S. Cl. ................................................... 426/5; 426/6
[58] Field of Search ............................... 426/3–6, 96

[56] References Cited

U.S. PATENT DOCUMENTS

| | | | |
|---|---|---|---|
| 3,761,286 | 9/1973 | Shepherd et al. | 426/5 |
| 3,962,463 | 6/1976 | Witzel | 426/5 |
| 4,206,301 | 6/1980 | Yolles | 426/3 |
| 4,252,830 | 2/1981 | Kehoe et al. | 426/5 |
| 4,386,206 | 5/1983 | Merritt et al. | 426/5 |
| 4,448,789 | 5/1984 | Yang | 426/5 |
| 4,711,784 | 12/1987 | Yang | 426/5 |
| 4,911,934 | 3/1990 | Yang et al. | 426/5 |
| 4,963,369 | 10/1990 | Song et al. | 426/5 |
| 4,992,280 | 2/1991 | Chu et al. | 426/5 |
| 5,000,965 | 3/1991 | Killeen et al. | 426/5 |
| 5,116,627 | 5/1992 | Rutherford et al. | 426/5 |
| 5,128,155 | 7/1992 | Song et al. | 426/5 |
| 5,139,787 | 8/1992 | Broderick et al. | 426/5 |
| 5,153,011 | 10/1992 | Patel et al. | 426/5 |
| 5,154,927 | 10/1992 | Song et al. | 426/5 |
| 5,154,938 | 10/1992 | Broderick et al. | 426/5 |

*Primary Examiner*—Jeanette Hunter

[57] ABSTRACT

Disclosed is chewing gum containing a flavoring component in which the flavorant is releasably adsorbed in a cross-linked elastomeric polymer.

16 Claims, No Drawings

CHEWING GUM CONTAINING FLAVORANT ADSORBED IN CROSS-LINKED ELASTOMERIC POLYMER

BACKGROUND OF THE INVENTION

The present invention relates to chewing gums, and in particular to gums containing flavorants of natural or artificial origin. The invention relates more particularly to gums having a particular flavoring component which comprises a specially prepared combination of flavorant and polymeric matrix.

The pertinent literature describes gum formulations in which the flavorant is entrapped, encapsulated, impregnated within porous microbeads or is otherwise physically surrounded.

One example is U.S. Pat. No. 4,711,784, which discloses chewing gum compositions including a high molecular weight polyvinyl acetate blended with a hydrophobic plasticizer which forms a film with the high molecular weight polyvinyl acetate. This film-coated polymer serves as an encapsulating composition for sweetener components such as aspartame. The film coating is considered necessary to control release of the sweetener during mastication of the gum, and to prevent undesired interaction between the sweetener and other components of the gum.

U.S. Pat. No. 4,386,106 discloses a delayed release encapsulated flavorant composition useful in chewing gums. This encapsulated composition is prepared by forming an emulsion of a flavoring agent in a partially hydrophilic matrix material comprising gelatin, a natural gum and plasticizer, drying the emulsion, grinding it, and then coating the resultant powder with a water-insoluble material. Here again, a coating is required so as to form a physical barrier to release of the flavoring component.

U.S. Pat. No. 5,153,011 discloses a flavor ingredient useful in chewing gum compositions, comprising flavoring agent, styrene butadiene rubber, starch or modified starch, optional water and thickeners such as silicon dioxide. The flavoring agent is mixed with the elastomer, whereupon an aqueous starch solution and thickener are added. There is no disclosure or recognition herein that using a cross-linked polymer can provide the additional benefits which the present applicants have discovered.

U.S. Pat. No. 4,992,280 discloses a flavorant release composition comprising polyvinyl acetate having a number average molecular weight of about 150,000 to 200,000 daltons, which composition can be incorporated into chewing gum. It is necessary to dissolve the polyvinyl acetate in a volatile non-reactive solvent as part of the procedure by which the flavorant is incorporated into the product. This patent also fails to disclose or recognize any advantages to the use of cross-linked polymer in preparing a flavorant useful in chewing gums.

U.S. Pat. No. 4,963,369 discloses chewing gums containing porous polymeric beads impregnated with flavor ingredients. The porous polymeric beads can be formed of polymerized styrene cross-linked with divinyl benzene. Such products have a number of characteristics, many of them relatively disadvantageous, by which they can be distinguished from the gums of the present invention. The disclosed polymeric beads must, of necessity, be confined to a particle size below the threshold particle size which may be detected by the consumer upon chewing the gum containing the particles. Otherwise, since the particles are not themselves chewable, their presence would be detected as a gritty or sandy texture which is decidedly undesirable in a chewing gum. Keeping the particles at such a very small size, however, leads to the fact that the particles have a very high surface area-to-mass ratio. This very high ratio, and the very microscopic size of the particles themselves, mean that the flavorant is relatively freely lost from the particulate beads. Accordingly, this patent teaches that it is commonly preferred to apply a coating or other barrier to the beads, after the flavoring agent has been applied into the beads, in order to retard and control loss of flavoring agent from the beads upon mastication of the chewing gum. By contrast, the gums of the present invention comprising discrete macroscopic pieces of cross-linked elastomeric polymer containing flavoring agent contribute to the positive flavor and chewability sensations of the gum even as they are considerably larger than microparticulate size. Moreover, the elastomeric pieces do not require any sort of film or other barrier to the removal of flavor from the polymeric matrix during chewing.

Those familiar with the manufacture of chewing gums and confections are aware that flavoring agents can be vulnerable to gradual degradation in finished products. This degradation can even be accelerated through mediation by one or more other ingredients present in the product. By "mediation" is meant that the presence of such other ingredient(s) in the form in which it or they are present appears to accelerate the decomposition of the flavorant, regardless of whether the mechanism of decomposition is chemical reaction, catalysis of reaction with other components, oxidation, or otherwise. The products which have the potential for mediating the degradation of the flavorants include sweeteners or other agents whose presence is obviously desirable in the final product. Past attempts to prevent or retard degradation of the flavorants have generally involved physically separating or isolating the flavorants within the formulation, by means such as encapsulation or other physical entrapment mechanisms, in order to enable the flavorants present to contribute as fully as desired to the flavor of the final product.

It is also recognized in this art that the consumer's perception of the flavorant(s) upon chewing is important to the acceptance of the gum or confection by the consumer. Attributes including the initial impact of flavor upon the onset of chewing, and the extension of duration of the flavor during chewing, are particularly important, the latter even more so than the former. Achieving a desirable balance of both properties is a challenge, particularly since it is frequently found that techniques which enhance one such property do so to the detriment of the other.

Thus, there is a need for chewing gum and confection compositions which satisfy the objectives of exhibiting a sufficient degree of flavor extension and initial flavor impact while protecting, and even enhancing, the stability of the flavorants present.

BRIEF SUMMARY OF THE INVENTION

The present invention meets the aforementioned objectives as well as other desired characteristics that will be apparent.

In one aspect, the present invention comprises a chewing gum comprising a gum base, a flavoring component, and optionally a sweetening component, wherein the flavoring component consists of one or more flavorants absorbed releasably in a solid matrix formed of a cross-linked elastomeric polymer. The polymer is preferably selected from the group consisting of polyvinyl acetate, copolymers of vinyl acetate and a second vinyl comonomer, styrene-butadiene rubber, natural rubber, butyl rubber and polyisobutylene. The sweetening component optionally comprises one or more sweeteners absorbed releasably in such a solid matrix.

Another aspect of the invention is an improved method of making chewing gum by combining in any sequence gum base, a flavoring component and, optionally, a sweetening component, wherein the improvement comprises using as the flavoring component one or more flavorants releasably absorbed in a solid matrix formed of a cross-linked elastomeric polymer. Optionally, one or more sweeteners releasably adsorbed in such a matrix is used as the sweetening component. The method extends the flavor, reduces plasticization of the gum by the flavorant, and retards or prevents oxidative degradation of the flavorant.

In another aspect of the present invention, the aforementioned chewing gum further comprises a sweetening component which consists of one or more sweeteners absorbed releasably in a solid matrix formed of a cross-linked elastomeric polymer.

DETAILED DESCRIPTION OF THE INVENTION

The invention will be described with respect to its preferred embodiment, in chewing gums. The chewing gum of the present invention comprises the gum base itself, optional solvents, and/or plasticizers. The amount of gum base employed will vary greatly depending on various factors such as the type of base used, consistency desired and other components used to make the final product. In general, amounts of about 5% to about 50% by weight of the final chewing gum composition are acceptable for use in the chewing gum compositions, preferred amounts thereof being about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as natural rubber, chicle, jelutong, gutta percha and crown gum. Synthetic elastomers such as butadiene-styrene copolymers, isobutylene-isoprene copolymers, polyethylene, polyisobutylene, polyvinyl acetate, and copolymers of vinyl acetate, and mixtures thereof, are particularly useful.

The gum base composition may contain elastomer solvents to aid in softening the elastomer component. Such elastomer solvents may comprise methyl, glycerol or pentaerythritol esters of rosins or modified rosins, such as hydrogenated, dimerized or polymerized rosins, or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene; and mixtures thereof. The solvent may be employed in an amount ranging from about 10% to about 75% and preferably about 45% to about 70% by weight to the gum base.

The gum base can also contain any of a variety of traditional ingredients such as plasticizers or softeners such as lanolin, stearic acid, sodium stearate, potassium stearate, glyceryl triacetate, glycerine and the like and/or waxes, for example, natural waxes, petroleum waxes, such as paraffin waxes and microcrystalline waxes, to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include conventional additives such as emulsifiers such as lecithin and glyceryl monostearate; and additional fillers such as dicalcium phosphate, tricalcium phosphate, aluminum hydroxide, magnesium hydroxide, alumina, aluminum silicates, calcium carbonate, and talc and combinations thereof. These fillers may be used in the gum base in various amounts. Preferably the amount of fillers when used will vary from about 4 to about 30% by weight of the final chewing gum.

The present invention contemplates the optional inclusion of a sweetener component which comprises any one or more sweeteners known in the art, including both natural and artificial sweeteners. Thus, sweeteners may be chosen from the following non-limiting list, which includes sugars such as sucrose, glucose, corn syrup, dextrose, invert sugar, fructose and mixtures thereof; saccharine and its various salts such as the sodium or calcium salt; cyclamic acid and its various salts such as the sodium salt; free aspartame; dihydrochalcone sweetening compounds; glycyrrhizin; Stevia rebaudiana (Stevioside); monellin, thaumatin, Sucralose, isomaltitol, neosugar, lactitol, polydextrose, and maltitol; and sugar alcohols such as sorbitol, sorbitol syrup, mannitol, xylitol, and the like. Also contemplated as a sweetener is the nonfermentable sugar substitute hydrogenated starch hydrolysate (also known as Lycasin) which is described in U.S. Pat. No. Re. 26,959. Also contemplated is the synthetic sweetener 3,6-dihydro-6-methyl-1-1,2,3-oxathiazin- 4-one-2,2-dioxide, particularly the potassium (Acesulfame-K), sodium and calcium salts thereof as described in German Patent No. 2,001,017.7.

Products within the scope of the present invention may include no sweetener at all. If sweetener is included, the amount of sweetener is effective to provide the desired degree of sweetness, generally 0.001 to 70 wt. % of the final product.

Suitable flavorants include both natural and artificial flavors and mints, such as oil of peppermint, menthol, oil of spearmint, vanilla, oil of cinnamon, oil of wintergreen (methyl salicylate), and various fruit flavors, including but not limited to lemon oil, orange oil, grape flavor, lime oil, grapefruit oil, apple, apricot essence, and combinations thereof. The flavorings are generally utilized in amounts that will vary depending upon the individual flavor, and may, for example, range in amounts of about 0.5% to about 3% by weight of the final composition weight.

Colorants can be present in the chewing gums and confections of the present invention. Examples include the pigments such as titanium dioxide and other dyes suitable for food, drug and cosmetic applications known as F.D. & C. dyes, and the like. The materials may be incorporated in amounts of up to about 1% by weight, preferably up to about 6% by weight.

The flavoring component of the gums and confections of the present invention preferably consists of one or more of said flavorants adsorbed releasably in a solid matrix formed of a cross-linked elastomeric polymer. This flavoring component, following preparation as described herein, is then incorporated with the other ingredients of the chewing gum or confection. Preferably, this flavoring component comprises about 0.005% to about 25% by weight of the final chewing gum product. No other suspending agent, filler, extender, nor entrapment agent, need be present in the sweetener component. This aspect of the present invention thus contributes ease and economy of formulation, with an unprecedented realization of benefits. In chewing gums those benefits include unimpeded onset of flavor during the initial chew coupled with a prolonged extension of the flavor effect during chewing, all of which are realized together with the full, undegraded effect of the sweetener component. Other benefits include lessening of the plasticization of the gum base by the flavorant, and retarded or eliminated oxidation of the flavorant.

Some, or all, of the sweetener used in the gums and confections of the present invention can also be in the form of a sweetening component in which one or more sweeteners is releasably adsorbed in a solid matrix of cross-linked elastomeric polymer. Preferably, the sweetener is one which is liquid at the conditions under which it is used to make such products. Sweeteners that are normally solids can be dissolved or suspended in a liquid which is then adsorbed into the matrix. The resulting component can then be readily added to the other ingredients used in making the gum or confection. This aspect of the invention thus contributes ease and economy of formulation, as well as the unimpeded onset of the desired sweetness coupled with prolonged extension of sweetness.

Notably, the use of the flavoring component and sweetening component described herein permits attainment of a given level of flavor and sweetness perception with less flavorant or sweetener, as the case may be; that is, the availability of the flavorant and/or sweetener appears enhanced. Without being bound by any particular theory, it is believed that the flavorant or sweetener is less likely to be masked within gum base, by absorption into the gum base or otherwise; under this theory, a greater proportion out of any total loading of flavor and sweetness is "available" for perception by the consumer.

In addition, particularly when the present invention is carried out using liquid flavorant syrups or solutions, the present invention permits the operator to avoid having to dry (spray-dry) the flavorant. This, in turn, reduces the cost of the operation and permits retention of the more volatile components of the flavorant, as drying generally requires the application of heat which would drive off the more volatile components and could even alter the structure of flavor components. As a result, the perceived flavor is stronger and fuller.

The cross-linked elastomeric polymer is preferably based on a polymer used in chewing gums, and more preferably based on a polymer that is present (in cross-linked or uncross-linked form) in the chewing gum. One such elastomeric polymer is styrene-butadiene rubber (SBR), that is, a copolymer of styrene and butadiene. There are numerous ratios of styrene to butadiene that can be employed, with 50:50 and 23:77 (styrene:butadiene) being commonly used chewing gum grades. The present invention preferably encompasses SBR with 0–70% styrene and 30–100% butadiene (mol %).

Another elastomeric polymer is butyl rubber, by which is meant an elastomeric copolymer of isobutylene and isoprene (preferably not more than 2 mol. % isoprene). Yet another elastomeric polymer is natural rubber, that is, a polymer of (trans-4-isoprene) or (cis-1,4-isoprene). Other elastomeric polymers include polyisobutylene. Cross-linked polyvinyl acetate can also be used to advantage in the present invention, as can copolymers of vinyl acetate and a second vinyl comonomer. In such copolymers, the vinyl acetate preferably comprises at least 50% of the copolymer; by "vinyl comonomer" is meant a comonomer of the general formula $CH_2=CHR$ where R is hydrogen or a substituent which preferably is a longer chain (up to $C_{24}$) acyloxy group such as vinyl laurate.

There are several methods by which the elastomeric polymer can be cross-linked. Cross-linking can be effected chemically, for instance by reaction of the polymer with a peroxide compound effective to cross-link the polymer. Peroxide compounds useful for this purpose are well known in the polymer arts; examples include di-tert-butyl peroxide, dicumyl peroxide, benzoyl peroxide, t-butyl hydroperoxide, t-butyl peroxybenzoate, t-butyl peroxyacetate, 1,1,4,4-tetramethyl tetramethylene bis (t-butyl peroxide), and hydrogen peroxide. Cross-linking can also be effected chemically by reacting the polymer with sulfur, preferably in the presence of any of the many known accelerators such as benzothiazole, thiurams like tetramethyl-thiuram disulfide, and thiocarbamates like zinc dimethyl dithiocarbamate.

Cross-linking of polymers such as polyvinyl acetate can be effected by lightly deacetylating the polymer, reacting the polymer with a difunctionally reactive cross-linking agent such as a lower alkyl dialdehyde, and then reacetylating the polymer.

Cross-linking can also be effected by subjecting the polymer to an effective dose of high-energy irradiation. The effect of the irradiation varies with the identity of the polymer, so attention must be paid to whether the irradiation may cause chain scission (as may occur with polyisobutylene) rather than cross-linking. In many instances the effectiveness and/or rate of cross-linking by radiation is enhanced by the presence of an enhancer; one example of an enhancer is trimethylol propane trimethacrylate. The radiation is typically high-intensity ultraviolet radiation, or electron beam radiation.

It is also possible to induce cross-linking by mechanical action, as by shearing the polymer for a length of time sufficient to form peroxide on the polymer chain. The appropriate conditions can be established experimentally for any given polymer.

The cross-linking can be carried out before the flavoring component is present in the polymer, or it can be carried out with the flavoring component already present in the polymer. In either case, the flavoring component is preferably introduced into the polymer by contacting the polymer with a solution of the flavoring component at a dilution which permits the flavoring component to permeate and penetrate into the polymer. Loadings of flavoring component (expressed as active ingredient) in the polymer are preferably at least 10 wt. %, more preferably at least 40 wt. %, up to 70 wt. % or even as high as 90 wt. %.

Satisfactory molecular weight ranges for the polymers before cross-linking are set forth in the following table:

| | |
|---|---|
| SBR | greater than 100,000 Daltons |
| PVAc | greater than 2,000 Daltons |
| Butyl rubber | greater than 400,000 Daltons |

| -continued | |
|---|---|
| PIB | greater than 50,000 Daltons |
| Nat'l rubber | greater than 5,000 Daltons |

The cross-linked polymer impregnated with the flavoring component may then be preferably subdivided into discrete macroscopic pieces, to aid in the incorporation of the polymeric flavorant into the other ingredients of the chewing gum. The cross-linked impregnated polymer can simply be mixed in with those other ingredients to be broken up by shear forces during mixing. After dispersion in the gum base, the cross-linked polymer is preferably in the form of pieces about 7 to 40 microns or larger in their longest dimension, preferably averaging about 14 microns. In the preferred form, the cross-linked polymer forms discrete pieces or "islands" in the final gum product. If desired, the islands can be given a color that is different from the color of the remainder of the gum, for a striking visual effect in the final gum piece.

The cross-linked elastomer/flavor matrix has an unusual consistency or texture such that when added to a gum batch, the cross-linked elastomer/flavor matrix is torn apart into tiny pieces which never completely mix into the gum to form a homogeneous mass. This is shown by the fact that when color is added to the cross-linked elastomer/flavor matrix which is subsequently added to a gum batch, the resulting mixture contains tiny color islands. This does not happen when non-cross-linked elastomer/flavor matrix is used. In this case, a homogenous distribution throughout the gum batch is shown by a homogeneous coloring of the gum. The texture of the cross-linked elastomer/flavor matrix is slightly different from normal gum which causes the particles to remain discrete and not be incorporated into the gum mixture, yet they are similar enough to be indetectable organoleptically. Although this is certainly the easiest way to mix the cross-linked elastomer/flavor matrix into the gum, alternative methods could be cryogrinding to a fine powder immediately prior to addition to the gum batch or premixing with sucrose in a high shear mixer which pulverizes the cross-linked elastomer/flavor matrix into fine particles ready for addition to a gum batch.

It should thus be recognized that the cross-linked elastomeric polymer is quite distinct from flavor-impregnated microparticulate polymeric beads used in gums described, e.g., in U.S. Pat. No. 4,963,369. The pieces of cross-linked polymer used in the present invention can be larger than such microparticulate beads. The cross-linked elastomer is chewable without loss of product attractiveness whereas the beads, which are hard and unyielding to the chew, would not be chewable and would therefore give the gum a very unpleasant gritty texture in the mouth.

Indeed, while the pieces of the cross-linked elastomeric polymer are not necessarily detectable upon chewing apart from the gum as a whole, they contribute not only to the flavor perception but also to the overall chewable texture perception of the final gum product.

In addition, prior teachings as to incorporating such microparticulate flavor-bearing beads teach that the beads are preferably coated, to retard the loss of flavor from the beads. By contrast, the cross-linked elastomeric polymer used in the present invention needs no such coating. This is the case because the cross-linking and larger particle size provides better retention of the flavor, releasing the flavor more gradually. Also, the ratio of surface area to volume of the pieces used in the present invention is several orders of magnitude lower than that of microparticulate beads, which means that the release of flavoring component is to a much greater extent controlled by diffusion from the interior to the surface in the present invention. Where for some reason it is desired to coat the cross-linked polymer "islands", satisfactory materials are any which form a coating and which are inert to the consumer. Examples include shellac, gelatin, polyvinyl acetate, elastomers, resins, zein, paraffin, fats and waxes. Encapsulating material may be hydrophobic or hydrophilic, and can comprise one or several layers of the same or different material. Encapsulation can be carried out using conventional powder-encapsulating equipment and procedures. It will thus be recognized that an emulsifier can be included in the encapsulating material to facilitate formation of the desired coating(s). Suitable emulsifiers have an HLB value of 2 to 13; examples include lecithin, polyglycerol esters, mono- and diglycerides, sorbitan monostearate, and polysorbate 60. Care must be exercised, though, to ensure that the resulting coated particles do not feel gritty to the teeth during mastication.

A sweetener, including one or more of any of the abovementioned sweeteners, can also be absorbed into the cross-linked elastomer and thus incorporated into gums of the present invention. The techniques for cross-linking the elastomer and for absorbing the sweetener or sweeteners into the cross-linked elastomer, are those set forth hereinabove as to flavorants.

Chewing gums in accordance with the present invention are formulated in accordance with essentially conventional processing technology. Thus, preferably, the gum base including any resins, plasticizers, fillers and/or other gum base components are softened together by heating and then mixed together with the flavoring component and optional sweetening component, and the mixture is stirred together for a time sufficient to insure a homogeneous mass. Flavoring and sweeteners can be solely in the particles of cross-linked elastomer or can also be in the rest of the gum matrix. The mass can be formed into pellets or into slabs from which individual stick-type pieces are cut using technology familiar to those skilled in this art.

The invention will be described further in the following examples which are provided for purposes of illustration without limitation.

EXAMPLE 1

A 50/50 (mol. %) styrene-butadiene rubber was milled on a rubber mill briefly to slightly peroxidize it and break down any gel content. Then 40 parts of flavorant per 100 parts of SBR was milled in and the mixture was compression molded for 3 minutes at 160° C. The rubber was now substantially insoluble in hot toluene, thereby indicating that it had been successfully cross-linked. The flavor-impregnated cross-linked elastomer which resulted was incorporated into a chewing gum. The gum was found to exhibit prolonged flavor retention and satisfactory performance as a chewing gum.

EXAMPLE 2

The procedure of Example 1 was repeated using a 23/77 (mol. %, styrene-butadiene) SBR rubber. Similar results were observed.

EXAMPLE 3

Benzoyl peroxide was milled at a rate of 2 parts per 100 parts of polymer at 23° C. into a 50/50 (mol. %) styrene-butadiene rubber into which 40 wt. % flavor and 0.5 wt. % FDC Blue #1 Aluminum Lake pigment had previously been absorbed. The resulting mixture was compression molded for 3 minutes at 160° C. The product thus formed, a cross-linked elastomer (now insoluble in hot toluene) containing flavor, was incorporated into a chewing gum. The gum was found to exhibit prolonged flavor retention and satisfactory performance as chewing gum.

EXAMPLE 4

Polyvinyl acetate (MW=160,000) (100 parts) was milled with 2 parts of benzoyl peroxide and 15 parts of 0.8-micron calcium carbonate. The resulting product was formed into a sheet of 13 mil. thickness which was cured for 4 minutes at 160° C. The sheet was immersed in cinnamon oil, allowed to drip dry, then wrapped in a silicone release liner and foil and left overnight. The resulting cross-linked polyvinyl acetate sheet was found to have absorbed flavoring giving the sheet a net flavoring content of 43 wt. %.

EXAMPLE 5

Polyvinyl alcohol (80% hydrolyzed) having an average molecular weight of 9,000 was dissolved in hot water. The solution was concentrated by evaporation to 50 wt. % polymer. Then an aqueous solution of 25 wt. % glutaric dialdehyde was added, following which the resultant solution was again concentrated. Acetic anhydride was then added until polymer precipitated from solution. That polymer, cross-linked polyvinyl acetate, was recovered and dried. 100 parts of this polymer was subjected to high shear blending with 67 parts of cinnamon flavoring. The product was a powder which had absorbed all the flavoring oil.

What is claimed is:

1. A chewing gum comprising:
   a gum base; and
   a flavoring component; wherein said flavoring component consists essentially of one or more flavorants absorbed in a cross-linked elastomeric polymer, wherein said one or more absorbed flavorants are releasable from said gum upon chewing of the gum.

2. A chewing gum according to claim 1 comprising about 0.005 to about 25 wt. % of said flavoring component.

3. A chewing gum according to claim 1 wherein said cross-linked elastomeric polymer is selected from the group consisting of cross-linked styrene-butadiene rubber, cross-linked butyl rubber, cross-linked natural rubber, cross-linked polyvinyl acetate, cross-linked copolymers of vinyl acetate, and cross-linked polyisobutylene.

4. A chewing gum according to claim 1 wherein the weight ratio of flavorant to polymer in said flavoring component is at least about 1:10.

5. A chewing gum according to claim 1 wherein said flavorant is selected from the group consisting of peppermint oil, menthol, cinnamon oil, spearmint oil, vanilla, wintergreen oil, lemon oil, orange oil, grape, lime oil, grapefruit oil, apple, apricot essence, and mixtures thereof.

6. A chewing gum according to claim 1, further comprising a sweetening component which consists essentially of one or more sweeteners absorbed in a cross-linked elastomeric polymer, wherein said one or more absorbed sweeteners are releasable from said gum upon chewing of the gum.

7. A chewing gum according to claim 6 wherein said sweetener is selected from the group consisting of sucrose, glucose, corn syrup, dextrose, invert sugar, fructose, saccharine, salts of saccharine, cyclamic acid, salts of cyclamic acid, aspartame, dihydrochalcones, glycyrrhizin, Stevia rebaudiana, monellin, thaumatin, Sucralose, isomaltitol, neosugar, lactitol, polydextrose, maltitol, sorbitol, sorbitol syrup, mannitol, xylitol, hydrogenated starch hydrolysate, Acesulfame, salts of Acesulfame, and mixtures thereof.

8. A chewing gum according to claim 1 wherein said cross-linked elastomeric polymer is cross-linked styrene-butadiene rubber.

9. A chewing gum according to claim 1 wherein said cross-linked elastomeric polymer is cross-linked butyl rubber.

10. A chewing gum according to claim 1 wherein said cross-linked elastomeric polymer is cross-linked natural rubber.

11. A chewing gum according to claim 1 wherein said cross-linked elastomeric polymer is cross-linked polyvinyl acetate.

12. A chewing gum according to claim 1 wherein said cross-linked elastomeric polymer is a cross-linked copolymer of vinyl acetate.

13. A chewing gum according to claim 1 wherein said cross-linked elastomeric polymer is cross-linked polyisobutylene.

14. A method of making chewing gum, comprising combining effective amounts of a gum base, a sweetener component and a flavoring component wherein said flavoring component consists essentially of one or more flavorants absorbed in a cross-linked elastomeric polymer.

15. The method of claim 14 wherein said flavoring component is made by providing said polymer in uncross-linked form and cross-linking it in the presence of said flavorant.

16. The method of claim 14 wherein said flavoring component is made by impregnating said cross-linked polymer with said flavorant.

* * * * *